US006423353B1

(12) United States Patent
Le Cheviller et al.

(10) Patent No.: US 6,423,353 B1
(45) Date of Patent: Jul. 23, 2002

(54) FOOD WHICH SLOWS DOWN THE SPEED OF INGESTION IN DOGS

(75) Inventors: Jean-Patrick Le Cheviller, La Chapelle Neuve; Patrice Ricour, Montpellier; Renaud Sergheraert, Baden, all of (FR)

(73) Assignee: Royal Canin S.A., Aigmargues (FR)

( * ) Notice: Subject to any disclaimer, the term of this patent is extended or adjusted under 35 U.S.C. 154(b) by 0 days.

(21) Appl. No.: 09/612,425

(22) Filed: Jul. 7, 2000

(30) Foreign Application Priority Data

May 19, 2000 (FR) .............................. 00 06425

(51) Int. Cl.$^7$ .................................. A23K 1/18
(52) U.S. Cl. .................... 426/2; 426/656; 426/658; 426/805
(58) Field of Search .................. 426/2, 658, 656, 426/805

(56) References Cited

U.S. PATENT DOCUMENTS

| | | | |
|---|---|---|---|
| 2,138,177 A | 11/1938 | Kruger et al. | |
| 2,385,068 A | * 9/1945 | Eshbaugh et al. | ................ 99/2 |
| 3,431,112 A | 3/1969 | Durst | |
| 3,796,812 A | 3/1974 | Baensch | |
| 3,946,123 A | 3/1976 | Hanna | |
| 4,006,266 A | 2/1977 | Bone et al. | |
| 4,364,925 A | 12/1982 | Fisher | |
| 4,743,460 A | * 5/1988 | Gellman et al. | ............. 426/549 |
| 5,094,870 A | * 3/1992 | Scaglione et al. | ........... 426/549 |
| 5,296,209 A | 3/1994 | Simone et al. | |
| 5,405,836 A | * 4/1995 | Richar et al. | .................. 514/23 |
| 5,407,661 A | 4/1995 | Simone et al. | |
| 5,431,927 A | * 7/1995 | Hand et al. | ...................... 426/2 |
| 5,500,239 A | * 3/1996 | Hayward | ..................... 426/516 |
| 5,532,010 A | * 7/1996 | Spanier et al. | ................. 426/94 |
| 5,567,466 A | 10/1996 | Dupont-Delhovren | |
| 6,010,720 A | 6/2000 | Derrieu et al. | |
| 6,117,477 A | * 9/2000 | Paluch | ........................ 426/623 |

FOREIGN PATENT DOCUMENTS

| | | |
|---|---|---|
| CA | 560490 | 7/1958 |
| DE | 3031896 | 2/1982 |
| EP | 0078186 | 5/1983 |
| EP | 0129235 | 12/1984 |
| EP | 0088574 | 6/1986 |
| EP | 0100157 | 5/1988 |
| EP | 0265740 | 5/1988 |
| EP | 0285409 | 10/1988 |
| EP | 0337571 | * 10/1989 |
| EP | 0363733 | 4/1990 |
| EP | 0191572 | 8/1991 |
| EP | 0552897 | 7/1993 |
| EP | 0575021 | 12/1993 |
| EP | 0645095 | 3/1995 |
| EP | 0668024 | 8/1995 |
| EP | 0909536 | 4/1999 |
| FR | 2664471 | 1/1992 |
| FR | 2720944 | 12/1995 |
| FR | 2725113 | 4/1996 |
| GB | 1440116 | 6/1976 |
| GB | 2238945 | 6/1991 |
| JP | 61293351 | 12/1986 |
| JP | 01039953 | 2/1989 |
| WO | WO 95 08931 | 4/1995 |

OTHER PUBLICATIONS

Burrows et al. 1990. J. of Small Animal Practice, 31:495–501.
Guilford W.G. 1996. *Strombeck's Small Animal Gastroenterology*. 3$^{rd}$ Edition. W.B. Saunders Company Ed., pp. 303–317.
Grimberg, et al, *Recueil de Médecine Vétérinaire*, 1991, 167 (10/11), 997–1003.
Viateau, *Recueil de Médecine Vétérinaire*, 1993, 169 (11/12), 985–997.

* cited by examiner

*Primary Examiner*—Chhaya D. Sayala
(74) *Attorney, Agent, or Firm*—Pennie & Edmonds LLP

(57) ABSTRACT

The present invention relates to a dry dog food, characterized in that it has the shape of a parallelepiped having dimensions from 29 to 40 mm×29 to 40 mm×19 to 30 mm. The invention also relates to the use of such a food for slowing down the speed of ingestion of foods by dogs, or as veterinary medicament or additive, in particular for its use in improving dentibuccal hygiene in dogs.

19 Claims, No Drawings

FOOD WHICH SLOWS DOWN THE SPEED OF INGESTION IN DOGS

The invention relates to a dry dog food, characterized in that it has the shape of a parallelepiped having dimensions from 29 to 40 mm×29 to 40 mm×19 to 30 mm. The invention also relates to the use of such a food for slowing down the speed of ingestion of foods by dogs, or as veterinary medicament or additive, in particular for its use in improving dentibuccal hygiene in dogs.

Originally, dogs were hunting carnivores descending from the wolf (*Encyclopédie du chien*, Ed. Hatier Royal Canin, 1997). Their mouth and their dentition are those of the Carnivora, although adapted for catching live or dead preys, for biting them, for tearing them and for chewing their meat.

The domestication of dogs by humans has profoundly modified the canine species in its size, its breeds and its behaviour.

As regards the size of dogs, they are commonly classified into three large categories: the small breeds (1 to 10 kg), the medium breeds (11 to 25 kg) and the large breeds (26 to 80 kg and more). In the last category, the largest dogs are sometimes called giant breeds.

Domestication has also changed the dietary behaviour of dogs. With no obligation to hunt for live or dead prey in order to feed themselves, and having the benefit of foods ready for consumption, whether they are home-made preparations or industrial foods (moist mash or dry foods), dogs are no longer in the habit of biting, tearing and chewing their food. They swallow these foods rapidly, almost without putting their dentition to work and without their water- and enzyme-rich saliva having had time to impregnate the food. Dogs thus fed are all the more gluttonous since the foods offered are increasingly appetizing. Additionally, the most gluttonous dogs are those which are large in size, their daily nutritional requirements being the highest.

Thus, dog owners and breeders are often heard complaining that their dogs eat too quickly, consequently risking disorders to their health.

Indeed, veterinarians describe several dog pathologies whose cause is an excessively rapid ingestion of foods.

The most benign condition, but nevertheless highly unpleasant both for the dogs and for their owners, for which an excessively rapid ingestion of food can be blamed, is the formation of dental tartar and plaque which are responsible for all periodontal diseases (A. Grimberg and Ph. Beltramo, *Recueil de Médecine Vétérinaire*, 1991, 167 (10/11), 997–1003). In order to combat the formation of dental tartar and plaque in pets, numerous methods, including the use of chemical additives, have been proposed. For example, the company Colgate-Palmolive Company has proposed several patented means: using a nutritionally balanced extruded food preferably having the shape of a cylinder or disc (disc shape) and containing fibrous striations (EP 0,575,021, U.S. Pat. No. 5,431,927), or using a "chew product" which is not a balanced food but an edible flexible matrix containing a cellulosic material and an additive (EP 0,522,897, U.S. Pat. No. 5,296,209).

At the other extreme of seriousness of the pathologies which can be caused by an excessively rapid ingestion of food is the stomach distension-twisting syndrome in dogs, particularly, but not exclusively, in pedigree dogs which are large in size. The excessively rapid ingestion of a meal is considered as a risk factor, without the nature or the quality of the foods being implicated in the veterinary literature (Véronique Viateau, *Recueil de Médecine Vétérinaire*, 1993, 169 (11/12), 985–997; C. F. Burrows and L. A. Ignaszewski, *Journal of Small Animal Practice*, 1990, 31, 495–501). The excessively rapid ingestion of food causes aerophagia, with rapid accumulation of gases which distend the stomach which can lead to gastric volvulus (W. G. Guilford, *Strombeck's Small Animal Gastroenterology*, 3rd edition, W. B. Saunders Company Ed., 1996, pp. 303–317).

There is therefore a need to find new means for bringing about a slower ingestion of foods by dogs, and particularly large breed dogs.

Industrial dog foods are classified into two main categories: moist foods and dry foods. Dry foods currently have the fastest growth rate on the pet food market.

Compared with moist foods, dry foods offer many advantages. They are convenient to use and easy to preserve. Furthermore, by virtue of their moisture level of less than 14%, they are more economical than moist foods; only 1 kg of dry food is required on average to obtain the equivalent of the nutritional supply of 4 kg of moist food.

Dry dog foods are provided in two main categories: single-component foods and multicomponent foods.

Single-component foods are foods in which the unit components are identical. Depending on their production technology, these may be granules, crumbs, flakes, kibles and the like.

The multicomponent foods are foods comprising at least two different unit components.

The applicant has discovered, surprisingly, that it is possible to slow down the ingestion of food by dogs, and particularly by large size or large breed dogs, by offering them a dry food of which one unit component has the shape of a parallelepiped having well-defined dimensions. The parallelepiped can have completely flat or slightly convex faces, and edges which are smooth or which have notches and grooves.

The three dimensions of the parallelepipedal food component of the invention are from 29 to 40 millimetres (mm)×from 29 to 40 millimetres×from 19 to 30 millimetres.

In another preferred embodiment of the invention, the unit component of the food will have the dimensions from 29 to 33 millimetres×from 29 to 32 millimetres×from 19 to 25 millimetres.

The invention also relates to dry dog foods of which one unit component has the shape and the dimensions described above. The shape and the dimensions of the foods are independent of the composition thereof, provided that they contain:

at least one source of protein of animal or plant origin, and/or at least one source of slow or rapid carbohydrates, in particular cereals and/or by-products thereof, and/or at least one source of fat of animal or plant origin.

A food of the invention can also serve as excipient for any veterinary medicament or additive useful for dentibuccal hygiene in dogs.

The following nonexhaustive and nonexclusive examples will illustrate the invention.

EXAMPLE 1

Commercially available dry dog foods of the major known brands were bought. The type and the shape of the unit components of each food are described. The dimensions of 10 unit components of each food are then measured using a sliding calibre.

The results are in the following Table 1:

TABLE 1

| Brand/food | Type and shape of the unit components | Average dimensions of 10 unit components (mm) |
| --- | --- | --- |
| Eukanuba Large Breed Regular (Ref: 17 10 00 CD4EN) | Single component Disc | Diameter: 17.9 Thickness: 7.6 |
| Purina Proplan Adult Rich in Chicken & Rice (Ref: 10 08 01 F0410231) | Single component triangle | Height: 19.0 Base: 17.7 Thickness: 5.4 |
| Royal Canin Size Maxi Adult 1 (Ref: B 10/03/01 04H57 P2) | Single component Disc | Diameter: 16.0 Thickness: 9.1 |
| Royal Canin Size Mini Junior (Ref: B 29/03/01 00H20 P6) | Single component triangle | Height: 8.9 Base: 9.0 Thickness: 3.9 |
| Royal Canin Size Medium Adult 1 (Ref: A 06/04/01 14H35 00097039) | Single component Disc | Diameter: 14.4 Thickness: 8.0 |
| Hills T/D (Ref: 12.00 021R50918) | Single component flat cylinder | Length: 28.3 Width: 25.9 Thickness: 18.0 |
| Hills Science Plan Large Breed Original with Chicken (Ref: 07 00 031 S 102100) | Single component Disc | Diameter: 13.9 Thickness: 9.8 |
| Pedigree Menu Senior (Ref: 07 01 01 L09 15:4) | Multicomponent tile + flake + bone | Tile: Length: 16.7 Width: 14.4 Thickness: 10.2 Flake: Length: 16.5 Width: 5.9 Thickness: 1.2 Bone: Length: 22.3 Width: 13.3 Thickness: 7.4 |

Thus, the disc shape is more common. It can also be noted that none of the foods examined had unit components having the shape and the dimensions of the unit component of the invention.

EXAMPLE 2

An adult dog food in the form of flour and having the following composition is manufactured:

| | |
| --- | --- |
| crude protein: | 26.0% |
| lysine: | 1.36% |
| arginine: | 1.63% |
| methionine: | 0.55% |
| fat: | 16.0% |
| crude cellulose: | 2.50% |
| inorganic matter: | 5.80% |
| calcium: | 1.00% |
| phosphorus: | 0.70% |

Using this food in flour form, two dry foods are manufactured with the same extruder of the Wenger trademark:
 a Control food whose unit component has the shape of a common kible, in the form of a disc 16.0 millimetres in diameter and 9.1 millimetres thick,
 an Experimental food whose unit component has the parallelepipedal shape of the invention and the dimensions of 33×32×20 millimetres.

These two foods are distributed individually to large breed dogs in the following manner: during a first meal, the Control food is distributed in a quantity equal to the usual ration for each dog and its ingestion time is measured with a timer; at the next meal, the Control food is replaced with the Experimental food.

The trial was performed on 3 dogs of the Rottweiler breed, 5 dogs of the Léonberg breed and 4 dogs of the Dogue Allemand breed.

As the breeds, sizes and appetites of the dogs are different, therefore receiving different rations, the ingestion time for the Control and Experimental foods for each dog is expressed homogeneously in seconds per 100 grams of ingested food. The individual results are presented in the accompanying Table 2.

TABLE 2

| | | | Ingestion time for 100 g of food (seconds) | | |
| --- | --- | --- | --- | --- | --- |
| Breed | Dog | Ration (g) | Control (C) | Experimental (E) | E/C (%) |
| Rottweiler | Nonda | 120 | 129.2 | 262.9 | 203.5 |
| | Onyx | 600 | 46.7 | 201.1 | 430.6 |
| | Madjie | 480 | 19.6 | 28.0 | 142.9 |
| Léonberg | O'zidane | 600 | 91.0 | 123.4 | 135.6 |
| | O'zidane 2 | 200 | 60.0 | 125.7 | 209.5 |
| | Nanon | 550 | 125.1 | 187.2 | 149.6 |
| | Jordan | 550 | 125.3 | 248.6 | 198.4 |
| | Jordan 2 | 200 | 123.0 | 245.1 | 199.3 |
| Dogue Allemand | Orselia | 580 | 22.1 | 37.7 | 170.6 |
| | Jade | 400 | 12.8 | 22.0 | 171.9 |
| | Jana | 580 | 27.8 | 42.3 | 152.2 |
| | Odyssée | 580 | 26.0 | 52.0 | 200.0 |

These results show that regardless of the dog, the ingestion time for the Experimental food is longer than that for the Control food.

EXAMPLE 3

A food in flour form having the following titre is manufactured:

| | |
|---|---|
| crude protein: | 31.0% |
| lysine: | 1.78% |
| arginine: | 1.95% |
| methionine: | 0.84% |
| fat: | 25.0% |
| inorganic matter: | 6.50% |
| calcium: | 1.35% |
| phosphorus: | 1.00% |

Using this food in flour form, 2 dry foods are manufactured with the same extruder of the Wenger trademark:
a Control food 2 whose unit component has the shape of a disc 14.4 millimetres in diameter and 8.0 millimetres thick,
and an Experimental food 2 whose unit component has the shape of the parallelepipedal food of the invention and the dimensions of 29×29×19 millimetres.

During a first meal, 5600 grams of the Control food 2 are distributed to a group of 7 young bitches of the Terre Neuve breed living and fed in a pack, and the ingestion time for the distributed ration is measured with a timer. At the next meal, the Control food 2 is replaced with the Experimental food 2.

The ingestion times for the 2 foods were respectively:
for the Control food 2: 564 seconds
for the Experimental food 2: 1192 seconds (211.5% of the Control food 2).

These results show that, as in the individually fed dogs of the preceding trial, the food according to the invention also slowed down the speed of ingestion in dogs fed in a group.

What is claimed is:

1. A dry food for feeding to a dog comprising:
   at least one unit component having
      at least one source of protein of animal or plant origin, and/or
      at least one source of carbohydrates, and/or
      at least one source of fat of animal or plant origin, wherein the unit component has the shape of a parallelepiped having dimensions from 29 to 40 mm×29 to 40 mm×19 to 30 mm.

2. The food of claim 1, wherein the parallelepiped has smooth edges.

3. The food of claim 1, wherein the edges of the parallelepiped contain notches or grooves.

4. The food of claim 1, wherein the parallelepiped has dimensions from 29 to 33 mm×29 to 32 mm×19 to 25 mm.

5. The food of claim 1, which when chewed improves dentibuccal hygiene in the dog.

6. A method of improving the dentibuccal hygiene in a dog comprising:
   providing a dry food comprising at least one unit component having
      at least one source of protein of animal or plant origin, and/or
      at least one source of carbohydrates, and/or
      at least one source of fat of animal or plant origin, wherein the unit component has the shape of a parallelepiped having dimensions from 29 to 40 mm×29 to 40 mm×19 to 30 mm; and
   feeding the food to a dog.

7. The method of claim 6, wherein the parallelepiped has smooth edges.

8. The method of claim 6, wherein the edges of the parallelepiped contain notches or grooves.

9. The method of claim 6, wherein the parallelepiped has dimensions from 29 to 33 mm×29 to 32 mm×19 to 25 mm.

10. The method of claim 6, wherein the dog is a large breed dog.

11. A method of making a dry food used for improving the dentibuccal hygiene in a dog, comprising:
    providing a composition having
       at least one source of protein of animal or plant origin, and/or
       at least one source of carbohydrates, and/or
       at least one source of fat of animal or plant origin,
       forming the composition into a least one unit component having the shape of a parallelepiped having dimensions from 29 to 40 mm×29 to 40 mm×19 to 30 mm.

12. The method of claim 11, wherein the parallelepiped has smooth edges.

13. The method of claim 11, wherein the edges of the parallelepiped contain notches or grooves.

14. The method of claim 11, wherein the parallelepiped has dimensions from 29 to 33 mm×29 to 32 mm×19 to 25 mm.

15. A method of slowing down the speed of ingestion of a food by a dog comprising:
    providing a dry food comprising at least one unit component having
       at least one source of protein of animal or plant origin, and/or
       at least one source of carbohydrates, and/or
       at least one source of fat of animal or plant origin, wherein the unit component has the shape of a parallelepiped having dimensions from 29 to 40 mm×29 to 40 mm×19 to 30 mm; and feeding the food to a dog.

16. The method of claim 15, wherein the parallelepiped has smooth edges.

17. The method of claim 15, wherein the edges of the parallelepiped contain notches or grooves.

18. The method of claim 15, wherein the parallelepiped has dimensions from 29 to 33 mm×29 to 32 mm×19 to 25 mm.

19. The method of claim 15, wherein the dog is a large breed dog.

* * * * *